United States Patent [19]

Cargould et al.

[11] Patent Number: 4,699,185

[45] Date of Patent: Oct. 13, 1987

[54] METHOD OF INFLATING TIRES

[75] Inventors: Barry D. Cargould, Akron; James C. Beebe, Medina, both of Ohio

[73] Assignee: Eagle-Picher Industries, Inc., Cincinnati, Ohio

[21] Appl. No.: 899,997

[22] Filed: Aug. 22, 1986

[51] Int. Cl.$^4$ .............................................. B65B 3/04
[52] U.S. Cl. ......................................... 141/1; 141/4; 152/415
[58] Field of Search ...................... 152/419; 141/1–12, 141/38, 65, 66

[56] References Cited

U.S. PATENT DOCUMENTS 3,877,496 4/1975 Sperberg .................................. 141/4

Primary Examiner—Houston S. Bell, Jr.
Attorney, Agent, or Firm—Wood, Herron & Evans

[57] ABSTRACT

Method of inflating tires wherein the tires are inflated to a bead seat pressure and thereafter the pressure is reduced without deflating the tires through the valve.

7 Claims, 1 Drawing Figure

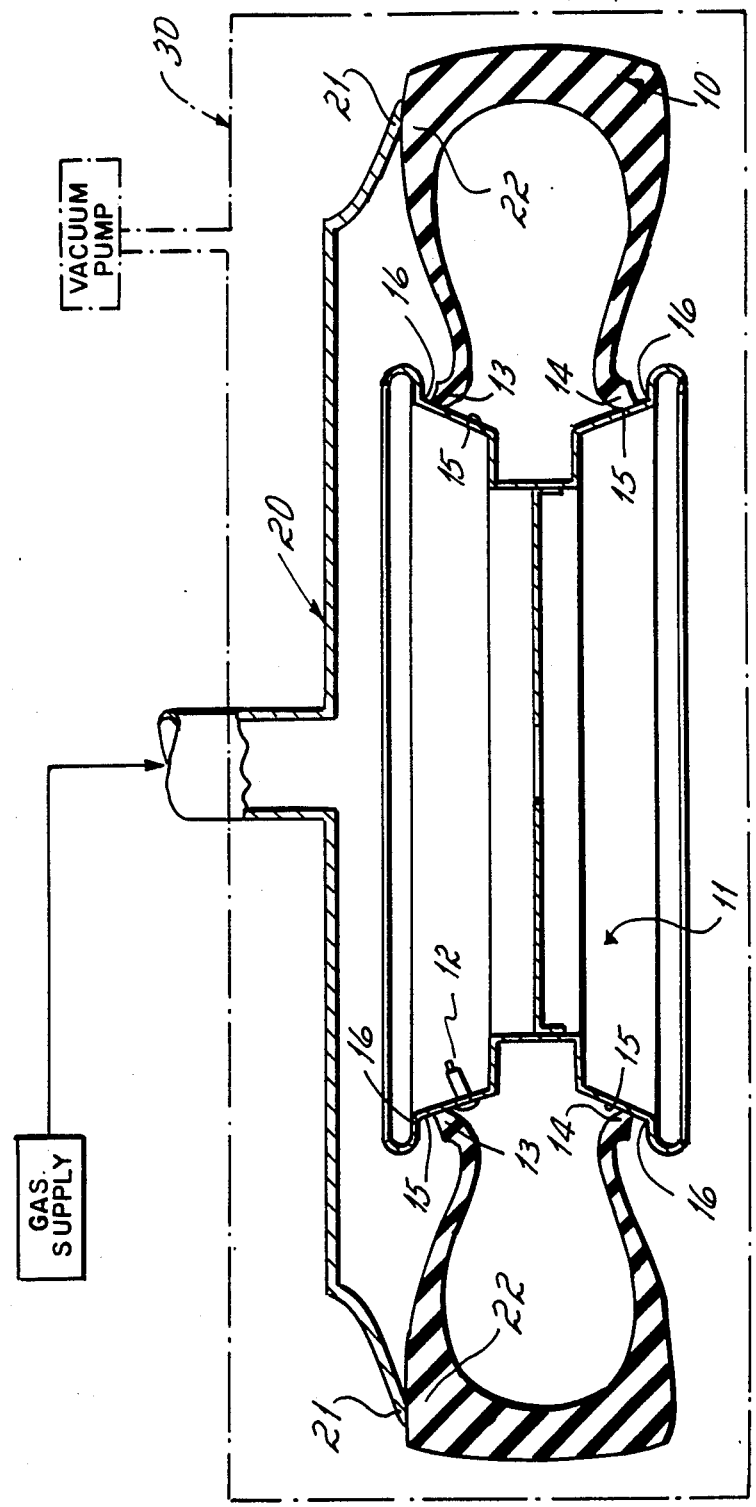

METHOD OF INFLATING TIRES

This invention relates to a method of inflating tubeless tires for production automobiles.

In the manufacture of automobiles, tires are placed on rims and inflated rapidly to an operational pressure. The tires are inflated by means of a fixture which drives air between the rim and bead of the tire rather than through its valve in order to effect the rapid inflation of the tire.

Inexplicably, some tires perform badly when mounted on the automobile even though the tires themselves and their rims have been previously tested to provide assurance of uniformity within the pre-scribed tolerances.

Prior to assembling, tires are tested on tire uniformity machines. Rims are tested on rim uniformity machines. These machines will show high points and low points in the force variations as the tires and rims are rotated on the respective machines. These points are marked on the tires and rims. When assembled, the tire high points are positioned adja-cent the rim low points and vice versa. Thus, the force variations are offsetting and where the force variations are within the prescribed limits, the assemblies should all perform within accepted limits.

As suggested above, some assemblies do not perform within acceptable limits. Owners complain of undesirable vibrations. Nevertheless, assemblies that perform badly, when returned to the manufacturer and reassembled, will perform acceptably.

The inventors believe this inconsistency of performance arises out of the difference in assembling the tires to their rims for production purposes. More specifically, it is believed that when the tires are assembled for production, some attain an improper bead seat. Each tire has two circular beads that form its free edges. Those beads seat in shoulders on the rim. The shoulder is referred to as the rim bead seat. It is tapered so that during inflation, the bead rides upon the rim forming a tighter and tighter seal until seated properly. If the bead is not driven, by the air pressure, far enough up on the rim, that is, if it is not seated properly, then the tire bead will not be at a uniform radial distance from the center of the wheel. That specific lack of uniformity is believed to cause the unacceptable performance when mounted on the automobile. The inventors believe that if the tires are mounted on the rims properly, the unacceptable performance will be eliminated.

As stated, at the automotive assembly operation, the tire is inflated through the rim to its desired pressure as, for example 30 psi. At the tire manufacturers, when testing the tire on its rim, the tire will be inflated first to a bead seat pressure, for example 45 psi, and then deflated to an operational pressure of 30 psi, the inflation and deflation being performed by introducing and releasing air via the tire valve.

It is believed that if the tire is inflated first to a bead seat pressure to be sure that the bead has ridden fully up the tapered portion of the rim to the rim bead seat, and if the pressure is thereafter backed off to operational pressure, the vexing problem of lack of uniformity would be solved. But to inflate to the bead seat pressure and back off to operational pressure, as done at the tire manufacturers, is simply too time-consuming and hence expensive an operation.

The objective of the present invention has been to provide a method of inflating the tire to a bead seat pressure and reducing that pressure within the tire to an operational pressure without requiring air to pass through the tire valve.

This objective of the invention is attained in any one of several methods which are as follows: using the equipment by which the tire is inflated through the circular opening between the rim and bead, air is introduced at a high temperature until the bead seat pressure is achieved. Thereafter, the tire is cooled to room temperature, thereby reducing the internal temperature of the tire to an operational pressure.

In another method, the tire is inflated with the combination of air and liquid, liquid at room temperature, the liquid being heated to a gaseous phase. For example, the most likely combination would be air and steam. After the tire has been inflated to a bead seat pressure, the gas is permitted to cool until it returns to its liquid phase, e.g. water, whereupon the lower operation pressure is achieved.

In another alternative, the tire is inflated with a combination of air and a low molecular weight gas such as helium. The helium will, after inflation to a bead seat pressure, escape through the pores of the tire, thereby bringing the tire back to the operational pressure.

As another alternative, the tire could be placed in a vacuum enviroment as, for example, 5 psi. The internal pressure is raised to bead seat pressure, for example 40 psi. When the tire is returned to atmospheric pressure, the internal pressure of the tire relative to atmospheric pressure will be at the operational pressure of 30 psi.

Finally, a combination of the various methods outlined above can be used.

The several features of the invention will become more readily apparent from the following detailed description taken in conjunction with the accompanying drawing which is a diagrammatic view of the inflating apparatus with which the present invention is used.

The apparatus by which the method of the invention is carried out is illustrated diagrammatically in the drawing. There a tire 10 is mounted on a rim 11, the rim having a valve 12. The tire has two beads 13 and 14. The beads engage a tapered portion 15 of the rim. As the tire inflates, the beads move into bead seats or shoulders 16 on the rim. The objective of the invention is to apply enough pressure (bead seat pressure) to provide assurance that the beads around the total circumference of each bead will be driven snugly into the bead seats. If a portion of the bead lags somewhat in being driven into the bead seat, then, because of the taper of the ramp 15, that portion of the bead is not at the same radial position as the remaining portions of the bead which are snug against the bead seat. This difference can cause an annoying vibration.

To inflate the tire, the apparatus provides a collar 20 having a rim 21 engageable with the sidewall 22 of one side of the tire. This is conventional apparatus used in the automotive industry. The collar 20 is connected with a gas supply by which gas under pressure is introduced into the collar and hence into the tire through the space between the bead and the rim.

If the tire is inflated, in this fashion, to a pressure equal to the bead seat pressure, then the beads will be driven, through the inflation process, snugly against their bead seats.

The function of the apparatus just described is to inflate the tire very rapidly, thereby reducing the expense of the inflation process for the four or five tires which are sold with each automobile. It is the custom in the automotive industry to inflate only to the operational pressure which may be 10–15 psi less than the bead seat pressure. The reason is that there has been no way of deflating the tire from the bead seat pressure to the operational pressure except through the valve 12. That deflating step is excessively time-consuming. It is therefore the objective of the present invention to provide for inflating to a bead seat pressure and thereafter effecting the deflation to the operational pressure without requiring the removal of air through the valve 12.

In one method of carrying out the invention, the gas supply is heated to the extent that the tire is first inflated to a bead seat pressure and then permitted to cool to room temperature, for example 80°. When the temperature is reduced to room temperature, the pressure within the tire of necessity reduces to the operational pressure. More specifically, assume that the inflation pressure is 35 psig (gauge) and the bead seat pressure is 50 psig, atmospheric pressure is 15 psi (absolute) and the volume is constant. Then the ratio of absolute pressure to absolute temperature is constant. If the ambient temperature is 540° R. (80° F.), then the desired condition is a temperature of 540° R. and a pressure of 50 psia. Multiplying the ratio of the desired temperature-to-pressure by the desired bead seat pressure (65 psia) results in the necessary inflation gas temperature to provide the desired bead seat pressure or bead seat, that temperature being 240° F. (702° R.). This is a temperature difference of 162°F. from ambient. Thus, raise the temperature of the air to 702° R. (240° F.) and use that high temperature air to inflate the tire to a bead seat pressure of 65psi. Upon cooling to ambient temperature, the pressure will reduce to an operational pressure of 50 psia.

In an alternative form of the invention, the tire is inflated with a combination of air and a liquid which is heated to a gaseous phase, the substance being liquid at room temperature. For example, water is the most likely candidate for this embodiment, although any substance which has the desired liquid-to-gas phase could be used. The combination of water and air is employed with the water being heated to steam and hence a high pressure when it is introduced into the tire. When the steam cools to water, the pressure will be rapidly reduced. Thus, the combined air and steam can be used to raise the internal pressure of the tire to the bead seat pressure, but upon cooling to ambient temperature the tire will be at the operational pressure.

Still another alternative is to inflate the tire with a combination of helium and air. The helium is of a low molecular weight compared to air and will escape through the pores in the tire after the tire is inflated. Thus, the tire can be inflated with the combination of two gases and after a short time, as the helium escapes, the pressure in the tire will return to operational pressure.

In still another alternative, the apparatus could be placed in a vacuum chamber indicated at 30. The vacuum chamber would be evacuated to 5 psi, for example. The tire would be inflated to a bead seat pressure of 40 psi. When the tire is removed from the vacuum chamber, atmospheric pressure will reduce the gauge pressure in the tire to 30 psi.

In a final embodiment, a combination of two or more of the previous embodiments could be employed.

From the above disclosure of the general priniciples of the present invention and the preceding detailed description of a preferred embodiment, those skilled in the art will readily comprehend the various modifications to which the present invention is susceptible. Therefore, we desire to be limited only by the scope of the following claims and equivalents thereof.

Having described our invention, we claim:

1. The method of inflating a tire comprising the steps of
   placing the tire on its rim with its valve stem in place,
   introducing a gas into said tire at a first pressure above atmospheric pressure sufficient to seat the bead of said tire on its rim,
   and reducing the pressure in the tire to an operational pressure without discharging gas through said valve of said tire.

2. The method of inflating a tire comprising the steps of,
   placing the tire on its rim with its valve stem in place,
   introducing gas into said tire via the space between the tire and rim until the pressure in said tire is sufficient to seat the bead of the tire on its rim,
   and reducing the pressure within the tire without discharging gas through the valve until said tire is inflated to the desired operational pressure with respect to atmospheric pressure.

3. The method as in claim 2 in which said gas is heated to a temperature well above ambient temperature and at that temperature is used to inflate the tire to the bead seat pressure, said gas when cooled reducing the internal temperature of said tire.

4. The method as in claim 2 in which said gas used to inflate the tire to a bead seat pressure is a combination of air and a liquid heated to a gas, said combination when cooling to ambient temperature reducing the pressure to an operational pressure by virtue of the gas cooling to a liquid phase.

5. The method as in claim 2 in which said gas used to inflate the tire to a bead seat pressure is a combination of air and a lower molecular weight gas such as helium, said lower molecular weight gas escaping to atmosphere after said tire has been inflated.

6. The method as in claim 1 in which said tire is placed in a vacuum of no greater than about 5 psi and the tire is inflated to about 40 psi relative to the evacuated environment, said tire, when removed from said evacuated environment, having a normal pressure of about 30 psi.

7. A method for seating a tubeless tire having a bead and a specified operating pressure fitted onto a rim having bead seats and an inflator valve comprising,
   introducing a gaseous material into the fitted tire at a pressure in excess of said specified operating pressure to force the beads into sealing contact with the bead seats, said gaseous material having a transient component which generates the pressure in excess of said specified operating pressure; and
   permitting said transient component to escape from said fitted tire to reduce said pressure in said fitted tire to said specified operating pressure.

* * * * *